US010417814B2

United States Patent
Papava et al.

(10) Patent No.: US 10,417,814 B2
(45) Date of Patent: Sep. 17, 2019

(54) METHOD AND APPARATUS FOR BLENDING LAYERS WITHIN A GRAPHICS DISPLAY COMPONENT

(71) Applicant: NXP USA, Inc., Austin, TX (US)

(72) Inventors: Dragos Papava, Bucharest (RO); Andrei Alexandru Trandafir, Bucharest (RO)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 15/982,328

(22) Filed: May 17, 2018

(65) Prior Publication Data
US 2019/0043249 A1 Feb. 7, 2019

(30) Foreign Application Priority Data
Aug. 4, 2017 (RO) ................ A201700551

(51) Int. Cl.
*G06T 15/50* (2011.01)
*G06F 9/50* (2006.01)
(Continued)

(52) U.S. Cl.
CPC .......... *G06T 15/503* (2013.01); *G06F 9/5044* (2013.01); *G09G 5/377* (2013.01);
(Continued)

(58) Field of Classification Search
CPC ...... G06T 15/503; G09G 5/395; G09G 5/377; G09G 2360/08; G09G 5/14;
(Continued)

(56) References Cited

U.S. PATENT DOCUMENTS 5,831,628 A 11/1998 Shimizu
6,069,633 A 5/2000 Apparao et al.
(Continued)

FOREIGN PATENT DOCUMENTS

CA 2752344 A1 3/2013
CN 103761094 A 4/2014
(Continued)

OTHER PUBLICATIONS

Non-final Office Action for U.S. Appl. No. 15/982,127 dated Apr. 4, 2019, 28 pages.
(Continued)

*Primary Examiner* — Maurice L. McDowell, Jr.

(57) ABSTRACT

A data processing system includes a graphics display component for creating an image to be displayed. The graphics display component includes: a display controller unit, DCU, a blend manager; and a processing unit. The blend manager is configured to: determine whether a capability of the DCU to simultaneously blend a number of surfaces of an image to be displayed is exceeded; and, in response to the DCU blending capability being exceeded: allocate a first portion of the surfaces to be blended to the DCU up to the determined DCU capability; and allocate a second portion of excess surfaces beyond the DCU blending capability to be blended to the processor unit. The processing unit blends the second portion of excess surfaces and the DCU blends the first portion of the surfaces together with the resulting blend from the processing unit, and or the DCU generates composite data for displaying the image.

20 Claims, 4 Drawing Sheets

(51) Int. Cl.
  *G09G 5/377* (2006.01)
  *G09G 5/395* (2006.01)
  *G09G 5/14* (2006.01)

(52) U.S. Cl.
  CPC .............. *G09G 5/395* (2013.01); *G09G 5/14* (2013.01); *G09G 2340/10* (2013.01); *G09G 2340/12* (2013.01); *G09G 2352/00* (2013.01); *G09G 2360/06* (2013.01); *G09G 2360/08* (2013.01)

(58) Field of Classification Search
  CPC .......... G09G 2360/06; G09G 2352/00; G09G 2340/10; G09G 2340/12; G06F 9/5044
  See application file for complete search history.

(56) References Cited

U.S. PATENT DOCUMENTS

| | | |
|---|---|---|
| 6,462,786 B1 | 10/2002 | Glen et al. |
| 6,700,580 B2 | 3/2004 | Lefebvre et al. |
| 6,917,877 B2 | 7/2005 | Yang |
| 7,505,048 B2 | 3/2009 | Su |
| 2006/0197771 A1 | 9/2006 | Tang et al. |
| 2010/0079489 A1 | 4/2010 | Cheng et al. |
| 2011/0157474 A1 | 6/2011 | Nagata |
| 2012/0117508 A1 | 5/2012 | Amendolagine |
| 2014/0258253 A1 | 9/2014 | Tirthapura et al. |
| 2014/0306957 A1 | 10/2014 | Herrick |
| 2015/0100884 A1 | 4/2015 | Ryu et al. |
| 2016/0240172 A1 | 8/2016 | Singh et al. |
| 2016/0328633 A1 | 11/2016 | Pan et al. |
| 2017/0076702 A1 | 3/2017 | Tomescu et al. |
| 2017/0200251 A1 | 7/2017 | Aubineau et al. |
| 2017/0316541 A1 | 11/2017 | Kim et al. |
| 2017/0329613 A1 | 11/2017 | Croxford et al. |
| 2018/0330468 A1 | 11/2018 | Mao |

FOREIGN PATENT DOCUMENTS

| | | |
|---|---|---|
| EP | 3270371 A1 | 1/2018 |
| RO | A201700550 | 8/2017 |
| WO | 2014139122 A1 | 9/2014 |
| WO | 2016087831 A1 | 6/2016 |

OTHER PUBLICATIONS

Devai et al, "A Rectangle-Intersection Algorithm with Limited Resource Requirements," 2010 10th IEEE International Conference on Computer and Information Technology (CIT 2010), 6 pages.

Devai et al, "An Optimal Rectangle-Intersection Algorithm Using Linear Arrays Only," downloaded May 16, 2018 from http://www.widelands.org/~sirver/wl/141229_devail_rects.pdf, 10 pages.

Final Office Action for U.S. Appl. 15/982,127 dated Jul. 26, 2019, 23 pages.

METHOD AND APPARATUS FOR BLENDING LAYERS WITHIN A GRAPHICS DISPLAY COMPONENT

FIELD OF THE INVENTION

The field of this invention relates to a method and apparatus for blending layers within a graphics display component, and in particular to an efficient software blending method and graphics display component.

BACKGROUND OF THE INVENTION

In embedded integrated circuit applications, such as automotive applications, embedded devices include display controllers for, say, infotainment, instrument cluster displays, etc. In order to enable dynamic content creation, with minimal central processing unit (CPU) intervention, it is known for such embedded display controller units (DCUs) to read (e.g. fetch) image data for individual graphics layers so that they can be displayed directly from memory and thereby blend the image data on-the-fly.

Graphical images displayed by automotive infotainment and instrument cluster displays are typically made up of a plurality of graphic layers that are combined (often referred to as 'blended') together in order to generate a composite image that is displayed to an end user. Accordingly, the embedded DCUs mentioned above fetch pixel data for multiple graphics layers, blend the pixel data for the multiple graphics layers to generate pixel data for the composite image to be displayed, and output the generated composite pixel data to a display device, all 'on-the-fly'.

Such embedded DCUs are typically implemented as hardware, and include a memory interface component that supports a plurality of data channels, each data channel arranged to receive pixel data relating to one graphics layer and store the received pixel data within a respective input (First-In-First-Out) buffer. The DCU may then perform functions, such as format conversion, blending, gamma correction, etc., 'on-the-fly' in order to generate composite pixel data to be output to a display device. Blending is performed over multiple graphical surfaces (for example, multiple picture/pixel rectangles) in order to form a single image for a display. It is known that the DCU may blend multiple surfaces simultaneously and may be used to off-load the blending from other processing units (such as, for example, a GPU).

One limitation is that the DCU is able to only blend a small number of simultaneously overlapping layers. Another limitation is that if there are more surfaces than available layers, the excess surfaces cannot be blended on the DCU (which is limited on the number of layers that it can support) and must therefore be blended by other processor units. In many such architecture, the DCU is only used to present the final, already-blended image on the screen. For architectures that make use of a different processing unit for blending, for example a GPU, the inventors have recognized and appreciated that the GPU is unable to write to a pixel from multiple sources of data at the same time, and it therefore has to render sequentially each surface onto the frame buffer. The time it takes for the DCU to write a pixel is constant when the number of layers increases (up to a maximum supported), but a GPU must access each layer in part and then write the combined result. Since the GPU is also used by applications to actually fill the surfaces, it becomes a major performance bottleneck, thereby causing contention between the various applications and the DCU (sometimes referred to as a 'compositor').

A number of solutions have been attempted to address the problem of blending and rendering of each surface of an image on to a frame buffer. US20120117508A1 describes a technique that proposes a window manager for embedded systems that only use a GPU for blending. This limits the performance of the window manager to that of the GPU and prevents the GPU from running other tasks. U.S. Pat. No. 6,700,580B2 describes a rendering system that uses multiple pipelines to generate multiple frame buffers that are then blended by a compositor. This setup subsequently restricts the applicable platforms (as they must provide multiple GPUs) and also restricts the number of surfaces. Furthermore, the compositor only blends using color averaging. A more flexible and less complex solution is therefore needed.

SUMMARY OF THE INVENTION

The present invention provides a graphics display component having a processor and a display controlling unit, and a method of blending layers within a graphics display component as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
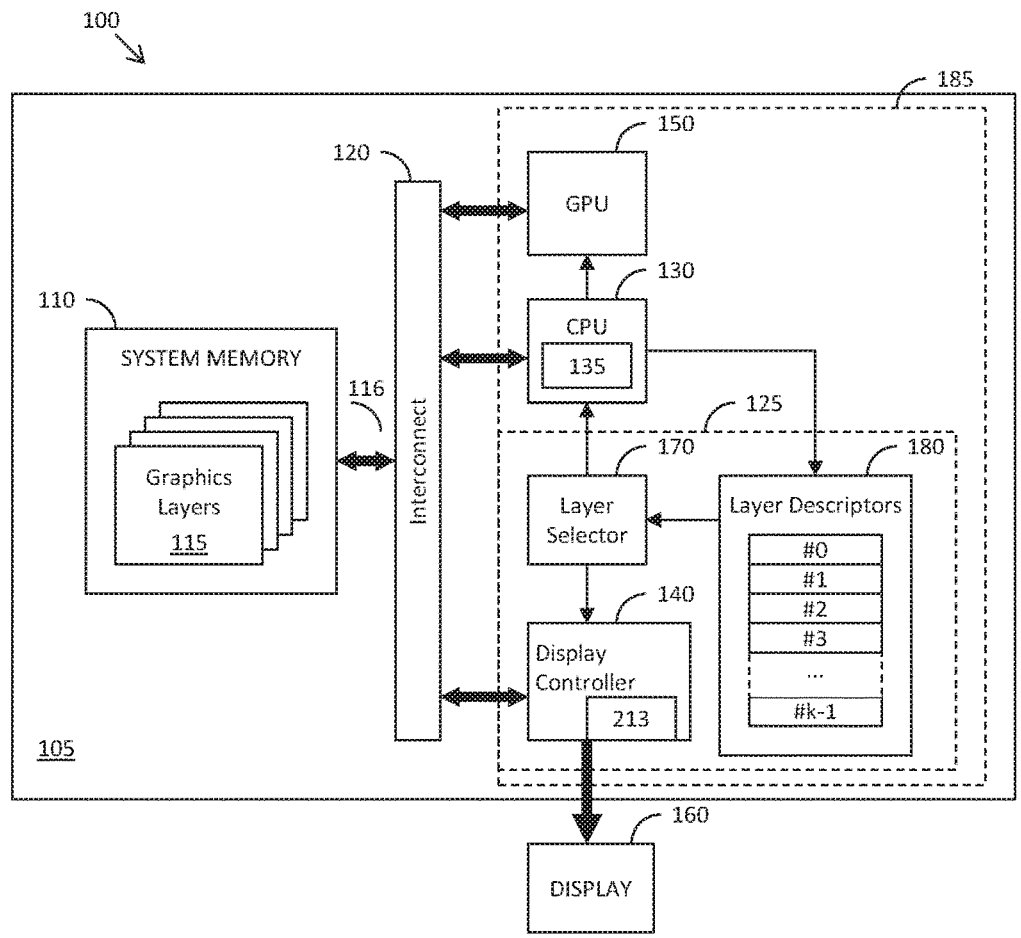
FIG. 1 illustrates a simplified block diagram of an example of a processing system, adapted in accordance with example embodiments of the invention.

Examples of the present invention will now be described with reference to the accompanying drawings. However, it will be appreciated that the examples of the present invention are not limited to the specific examples herein described and as illustrated in the accompanying drawings.

It is recognised that the prior art focuses almost exclusively on GPU-only blending solutions, even on platforms that might offer a DCU as well. A primary limitation of the DCU, is that it is unable to blend more than a small number (e.g. 4-6) of layers that simultaneously overlap. Examples of the present invention propose a solution that covers both a software implementation and associated hardware to provide an efficient surface compositor that utilizes both the DCU and at least one processing unit, such as the GPU, for blending surfaces. Examples of the invention aim to use the DCU as often as possible for blending to achieve maximum performance, and off-load blending work to the at least one processing unit, such as the GPU, only when the hardware limitations of the DCU are reached. Examples of the invention describe a mechanism for receiving sets of mutually-overlapping surfaces and then allocating and splitting the sets of mutually-overlapping surfaces between the at least one processing unit, such as the GPU, and a DCU for blending, in order to ensure accurate per-pixel blending correctness as well as optimum performance. Advantageously, the surfaces are distributed in the most efficient manner between both a DCU and the at least one processing unit, such as a GPU, that DCU usage may be optimally utilized.

In this manner, the DCU is primarily selected for blending multiple layers in parallel, to facilitate significantly faster blending than purely on a GPU or CPU. Examples of the invention aim to use the DCU as much as possible and use the at least one processing unit (e.g. the GPU) as rarely and as little as possible, requiring it only when the hardware limitations of the DCU are reached. This results from the DCU being a hardware module that blends all layers in parallel, whereas the at least one processing unit (e.g. the GPU) is unable to write to the same pixel from multiple sources at the same time. Advantageously, as long as the DCU's layer capacity is not exceeded, no additional in-memory frame-buffers are required when compared to the known use of GPUs for blending all data, which require explicit frame-buffers to be created that serve as an accumulator for all layers' data. In contrast, examples of the invention only require a use of additional in-memory frame-buffer for the amount of off-loaded blending that the DCU hands over to the at least one processing unit (e.g. the GPU or CPU). The DCU is also the controller that outputs the resulting data to the display, and thus it is able to readily blend all sources in parallel and then output the result directly on the display without a need for additional in-memory frame-buffers.

Advantageously, the use of at least one processing unit (such as the GPU) may also be used to avoid any DCU hardware blending limitations, thereby achieving both visual correctness when blending as much as possible using the DCU as well as a significantly higher performance than a comparable GPU-based surface compositor when using both a DCU and the at least one processing unit (e.g. GPU) when needed due to a number of surfaces requiring bending exceeding a number of layers that can be handled by the DCU.

Referring now to FIG. 1, there is illustrated a simplified block diagram of an example of a video data processing system 100 comprising a graphics display component 125. In some example embodiments, the data processing system 100 may include an embedded processing system, for example for use within an automotive application. For the example illustrated in FIG. 1, the data processing system 100 may reside within an integrated circuit device 105 and includes one or more memory elements forming a system memory 110. The system memory 110 may include, for example, flash memory, RAM (random access memory), etc. An interconnect component 120 is coupled between the system memory 110 and various system components, and arranged to enable said system components to access the system memory 110, for example to read and/or write data thereto. In the illustrated example, the system components include one or more processor(s), such as a central processing unit (CPU) 130, one or more display controller units (DCU) 140, and one or more graphics processing units (GPU) 150.

The illustrated DCU 140 forms a part of the graphics display component 125 for the processing system 100, and is arranged to fetch pixel data 116 for selected graphics layers 115 stored in system memory 110, blend the pixel data 116 for the selected graphics layers 115 to generate composite pixel data to be displayed, and output the generated composite pixel data to a display device 160. The graphics display component 125 for the illustrated example further includes a layer selection module 170 arranged to receive layer descriptors for the graphics layers 115 stored in system memory 110, select the graphics layers 115 to be blended by the DCU 140 for each pixel, and configure the DCU 140 to fetch the selected graphics layers 115 for each pixel. A primary function of the DCU 140 is to combine/blend the pixels from all pipelines and generate an output image. In the illustrated example, the layer descriptors are stored within a descriptor register set 180. However, they may alternatively be stored within an area of system memory 110, or alternatively within some other area of memory, such as a dedicated area of memory (not shown).

In accordance with examples of the invention, the one or more processor(s) 130 has been adapted to run a computationally efficient software algorithm 135 that is configured to detect if the blend limit is exceeded. In response thereto, the software algorithm 135, in conjunction with the blend manager 213 of the graphics display component 125 is configured to determine how much blending is to be performed by the DCU 140, and, dependent upon whether the blend limit is exceeded, determine how much blending is to be offloaded to the at least one processing unit (e.g. GPU 150). In this manner, the software algorithm 135 is configured to take, as its input, the positions of all layers and outputs all maximal sets of simultaneously-overlapping layers, once these maximal sets are available. The blend manager 213 then determines how to split the layer blending, so as to offload as little blending as possible, but as much as necessary, to the at least one processing unit (e.g. the GPU 150) in order to keep the DCU 140 at optimum utilization. Hereafter, in some examples, the offloading of blending will be described with reference to off-loading to the GPU 150, whereas in other examples it is envisaged that the offloading of blending may be allocated to any other processing unit, such as CPU 130.

Advantageously, the software algorithm 135 is able to determine the maximal sets of surfaces (for example given as rectangles) that require blending. In examples of the invention, the software algorithm 135 performed by the one or more processor(s) 130 takes N rectangles, e.g. given by $(x_1, y_1, x_2, y_2)$, which can overlap in any way possible, as well as specify M as a maximum number of rectangles that the DCU 140 can blend simultaneously. Thereafter, in some examples, the software algorithm 135 performed by the one or more processor(s) 130 also extracts an optimal subset of layers from those to be blended on DCU 140, based on the capability of the DCU 140, such that the GPU 150 will blend the minimal necessary set of layers, and the result, together with the remaining layers not scheduled to be blended by the GPU 150, will be correctly blended by the DCU 140 into an image that gets displayed.

A compositor 185, which typically refers to a collection of all of the hardware and software components (e.g. graphics display component 125, the one or more processor(s) 130, the GPU 150, etc.) manages the entire blending process (i.e. goes from an initial, arbitrary list of N surfaces, specified by their X, Y coordinates, size, transparency, content and blend order, and outputs just a single surface, which is the result of the N surfaces being correctly blended together. The compositor 185 uses an efficient software algorithm 135 to first detect the surfaces that cannot be mapped directly to DCU layers, for example because they exceed the DCU's simultaneous overlap limit. Based on this, and using a minimum-cost approach, it determines the sets of surfaces that cannot be blended by the DCU 140 and assigns them to the GPU 150 for blending. The resulting, GPU-blended surfaces are then combined with the remaining original surfaces blended by the DCU 140 and mapped to the DCU's layers for final rendering on the display 160.

The compositor 185 aims to provide improved performance, for example by utilizing the DCU 140 for blending as much as possible, and the GPU 150 for blending as little as possible. Furthermore, the compositor aims to guarantee 100% blending correctness, as it aims to ensure that windows are rendered in the correct logical order, and that incorrect blending caused by DCU limitations is excluded. Additionally, the compositor is configured to implement GPU off-loading, by no longer requiring the GPU 150 to blend all surfaces. In this manner, the compositor releases the GPU 150 for other applications (for example the applications that actually fill the surfaces).

Figure 2:
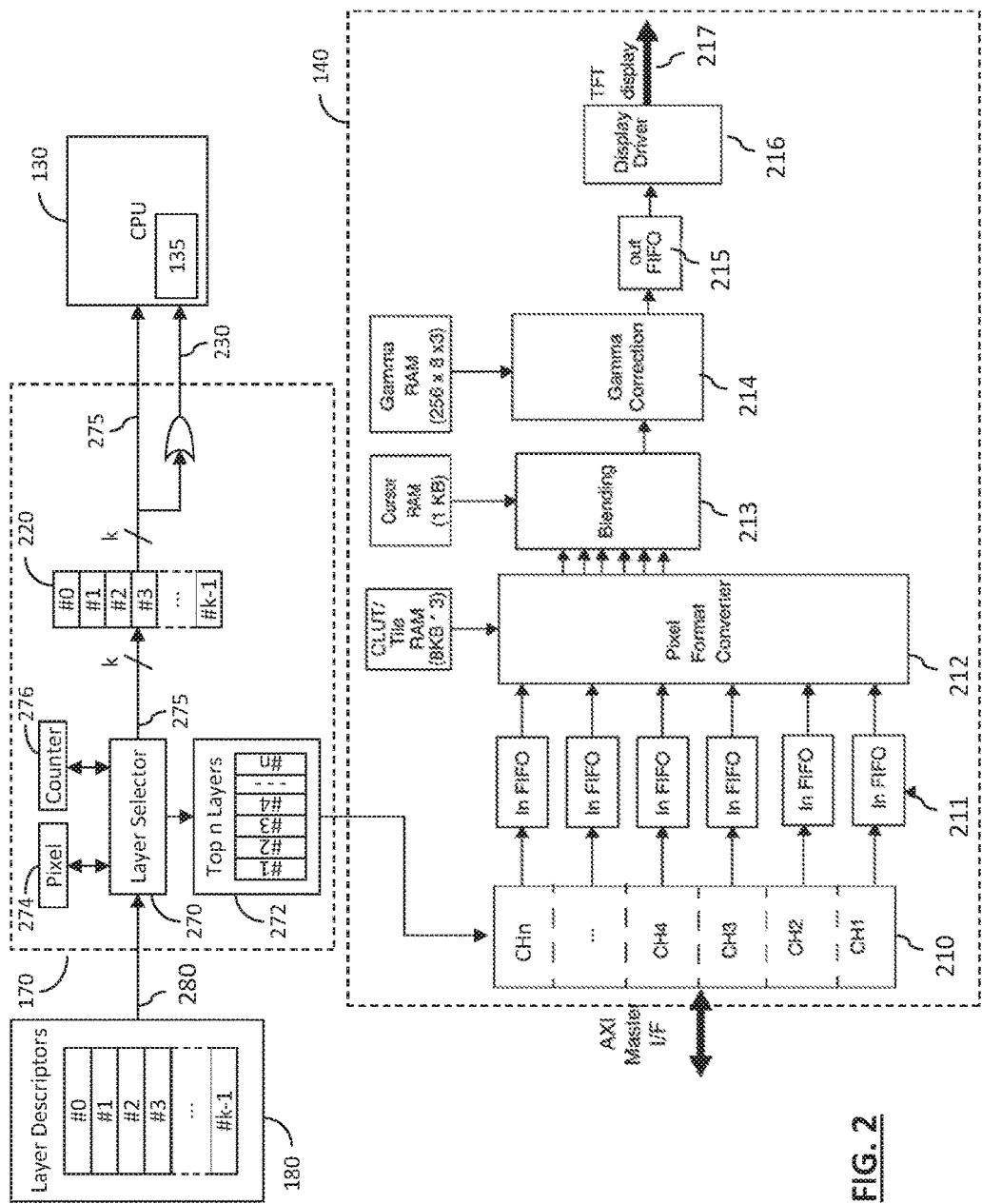
FIG. 2 illustrates an example of a graphics display component with a pixel blending circuit, adapted in accordance with example embodiments of the invention.

FIG. 2 illustrates an example of a data processing system that includes a graphics display component 125 in greater detail. The DCU 140 includes a memory interface component 210 arranged to receive image data 116 from memory 110 (see FIG. 1). The memory interface component 210 includes a plurality of data channels ($CH_1$-$CH_n$), each data channel being arranged to receive pixel image data 116 relating to one graphics layer. Received pixel image data 116 is stored within input (First-In-First-Out (FIFO)) buffers 211; each data channel of the memory interface component 210 storing received pixel image data 116 within its own input buffer 211. A pixel format converter 212 receives the pixel image data for the individual graphics layers from the input buffers 211, which may be encoded in different formats, and converts the pixel image data into a common format, for example a 32-bit RGBA format, to enable subsequent blending of the layers to be more easily performed. One example suitable format is pre-multiplied RGBA (meaning the Alpha channel is already applied to the R, G and B channels). In some examples, this format may be required when one of the layers that is being blended, is itself the result of multiple layers' blending, as is the case when some layers must be offloaded to the GPU 150 for blending, and their result placed between the other layers of the DCU 140 for final blending (between being relative to the blending order decided upon by the compositor 185), as described further with reference to FIG. 3.

A blend manager 213 receives the converted pixel data for the individual graphics layers and blends the pixel data to generate composite pixel data to be displayed. A gamma correction component 214 performs gamma correction on the composite pixel data, and outputs the corrected composite pixel data to an output buffer 215. A display driver 216 reads the (gamma corrected) composite pixel data from the output buffer 215, and transmits display data 217 to the display device 160, the display data comprising the composite pixel data read from the output buffer 215.

In this example, the memory interface component 210 consists of n (e.g. 6) data channels. In this manner, the DCU 140 is able to generate pixel data for each individual pixel within a composite image to be displayed from a blend of up to n graphics layers. However, the number of graphics layers that make up the composite image as a whole may be significantly more than the capacity (n) of the DCU 140. As illustrated in FIGS. 1 and 2, the descriptor register set 180 may be able to store descriptors for up to k (e.g. 32) layers for the composite image as a whole. For each pixel, the layer selection module 170 is arranged to select up to n layers from which pixel data is to be blended in order to generate composite pixel data for the respective pixel, and to configure the memory interface component 210 of the DCU 140 to fetch the relevant pixel data for the selected (up to) n layers.

Due to the adaptable nature of such a graphics display scheme, the algorithm 135 takes into account that the DCU employs (or is subjected to) two blending limits. A first DCU limit is a number of layers that can be processed in parallel by the DCU 140, for example 32-64. A second DCU limit is a number of overlaps that can be processed simultaneously (for example 4-6), such that the algorithm determines a number of active graphics layers (m) simultaneously overlapping within a single pixel that exceeds a number of layers (n) that the DCU 140 is capable of handling. To this end, in the illustrated example, a software algorithm 135 performed by the one or more processor(s) 130 may be arranged to instruct the layer selection module 170 to identify a set M of active layers of overlapping rectangles for each pixel, configure the DCU 140 to generate composite pixel data for the respective pixel based on a subset N of layers from the set M, determine whether the number m of active layers in the set M exceeds the maximum capacity n of the DCU 140, and the DCU 140 is configured to output any excess active layers in the set M that exceed the maximum capacity n to the GPU 150.

For example, each layer descriptor 280 may comprise indications of the position within the image to be displayed of the respective graphics layer, and dimensions therefor. From such information, the layer selector 270 may determine whether the respective graphics layer overlaps a particular rectangle coordinate, and thus whether the respective graphics layer is 'active' for that rectangle coordinate.

Having identified the set M of active layers for a particular rectangle coordinate, the layer selector 270 may then select a subset N of up to n active layers from the set M to be blended by the DCU 140 to generate composite rectangle coordinate data for the respective rectangle. The subset N may be selected based on any suitable criteria. For example, the subset N of active layers may be selected based on a predefined order of the layer descriptors 280 within the descriptor register set 180. In this manner, the priority with which layers are selected for the subset N may be determined based on their respective location within the descriptor register set 180. Accordingly, the layer selector 270 may be arranged to sequentially read layer descriptor information 280 from the layer descriptor register set 180 in priority order, and select the first n graphics layers identified as being active for the respective rectangle coordinate. In the example illustrated in FIG. 2, parameters for each selected active layer may then be stored, for example within selection registers 272. The stored parameters may comprise, for example, address information from where the respective rectangle coordinate data for the selected layer may be retrieved from memory 110, etc. The DCU 140 may then identify a second set U of active layers for a particular rectangle, the layer selector 270 may then select a subset V of up to v active layers from the set M to be blended by the GPU 150, to generate composite rectangle coordinate data for the respective rectangle. Thus, once the software algorithm 135 identifies the set M of active layers, the software algorithm 135 or some other software code (not shown) may be configured to split M into n−1 layers that are bound directly to the DCU 140 and m−n+1 layers that are blended on the GPU 150, with the result being bound to the remaining DCU layer. The DCU 140 itself only takes the n layers bound to it, composes them and displays the result on a screen.

When the subset N of active layers have been selected for a pixel, with parameters for the selected subset N of active layers having been stored within the selection registers 272 in the example illustrated in FIG. 2, the layer selection module 170 is arranged to configure the DCU 140 to generate composite pixel data for said pixel based on the selected subset N of active layers, for example by configuring the memory interface component 210 of the DCU 140 with address information for the selected subset N of active layers, etc., stored in the selection registers 272. In this manner, each channel of the memory interface component 210 may be configured to fetch pixel data from an area of memory defined within the layer descriptor for a respective graphics layer within the selected subset N of active layers.

Alternatively, the software algorithm 135 performed by the one or more processor(s) 130 may be arranged to cause some of the layers from which the composite image is to be generated to be pre-blended by the GPU 150, in advance of the DCU 140. The pre-blending with pixel data for a resulting pre-blended layer may be stored in memory 110 and a descriptor for the pre-blended layer may be loaded into the descriptor register set 180. In this manner, multiple original layers from a set V may be pre-blended in advance, in order to generate one or more pre-blended layers to be included within a set V'. Such pre-blending of graphics layers may be performed by computer code executing on the CPU 130, or alternatively such pre-blending may be offloaded to a GPU, where available, such as the GPU 150 illustrated in FIG. 1.

The importance of a graphics object may depend on any appropriate factors, such as, for example, an importance value (e.g. corresponding to the priority value of the corresponding layer) defined for the graphics object, as well as various situational parameters. For example, at night a warning that a vehicles lights are not working properly is more important than during the day. Accordingly, a graphics object used to warn that a vehicle's lights are not working may have a higher importance at night than during the day. Accordingly, the computer program code 135 may additionally determine the importance of a graphics object based on a simple or a complex decision making algorithm, taking into account any number of factors as appropriate.

In the illustrated embodiment, and as described below, the blend manager determines which layers are to be blended by the DCU and which by the GPU 150. However, it is contemplated that in some alternative embodiments, a different graphics management component may be configured to determine the split of responsibility of blending of layers and to take steps to determine whether such an excess number of layers can be accommodated by the GPU 150. Such a blend manager may be implemented within a stand-alone component, for example a dedicated hardware component or another processing core.

Figure 3:
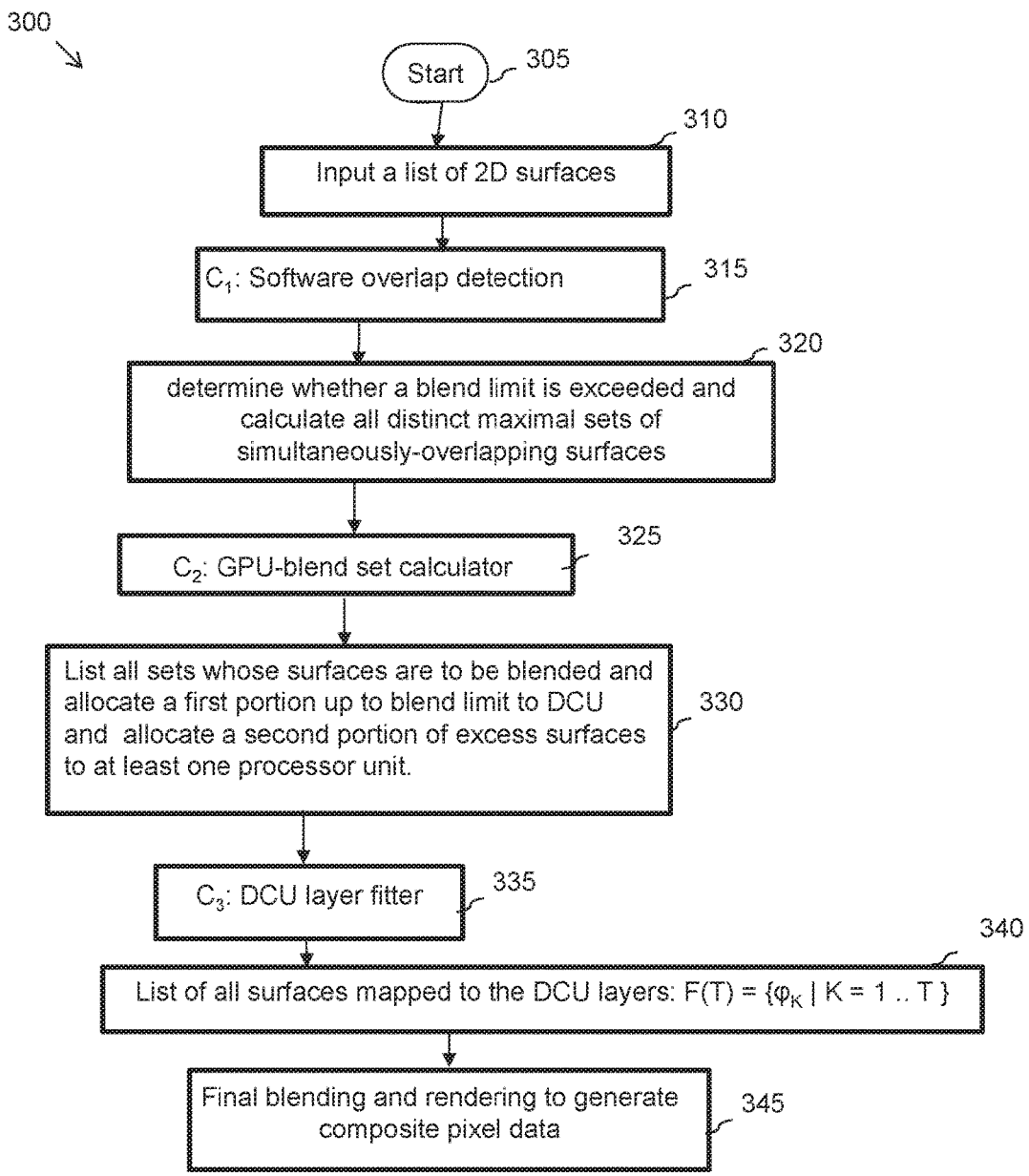
FIG. 3 illustrates an example of a high-level flowchart of a pixel blending operation, in accordance with example embodiments of the invention

Referring now to FIG. 3, an example of a high-level flowchart 300 of a pixel blending operation is illustrated, in accordance with example embodiments of the invention, such as may be implemented within the processing system 100 illustrated in FIG. 1. The flowchart 300 starts at 305 and at 310, the processing system receives as an input a list of a variable number of, e.g. 2D, surfaces, for example given as rectangles $L(N)=\{R_K|K=1 \ldots N\}$. Here, one rendering order may follow the rule of, say: if some $R_i$ and $R_j$ overlap and i<j, then $R_i$ must appear 'above' $R_j$.

Effectively, the overlap detection process identifies all distinct, maximal overlapping sets of simultaneously-overlapping surfaces $(S(M)=\{\sigma_K|K=1 \ldots M\})$ whose elements would otherwise be blended incorrectly if they were mapped to individual 2D-DCU layers, as in 320. Thus, let $\sigma_K$ be one of the maximal sets of layers that simultaneously overlap and whose size is greater than the DCU's blend limit. In some examples, the algorithm outputs a list of sets of the form $\sigma_K=\{R_{i1} \ldots R_{iQ}\}$, with the size of each $\sigma_K$ being greater than the DCU's simultaneous overlap limit: $|\sigma_K|>BL_{DCU}$.

If each surface $R_i \in \sigma_K$ is mapped to one DCU layer, then only the first $BL_{DCU}$ surfaces will actually be blended. However, since $|\sigma_K|>BL_{DCU}$, some elements in $\sigma_K$ will not be blended at all, which would ordinarily lead to a visually-incorrect output. Therefore, in accordance with examples of the invention and at 315, a software algorithm for the detection of overlapping rectangles is run, such as software algorithm 135 performed by the one or more processor(s) 130 in FIG. 1 or FIG. 2, determines those surfaces (given as overlapping rectangles) that require blending, but whose cardinality is higher than the maximum allowed. The algorithm outputs all distinct, maximal (highest-sized) sets of surfaces (rectangles) with these properties. Each of a computed maximal set of surfaces is passed directly to a blend manager, such as blend manager 213 of FIG. 2. Hypothetically, given one set $\sigma_K$ with $|\sigma_K|=Q_j$ with $Q>BL_{DCU}$, if $BL_{DCU}-1$ layers were bound directly to the DCU pipelines, and if the remaining $Q-BL_{DCU}+1$ elements were taken and blended on the GPU, and then the resulting surface mapped to only a single 2D-DCU layer, then $\sigma_K$ could be rendered using exactly $BL_{DCU}$ layers with a 100% pixel-correct output. Thus, in one example, the list of all distinct maximal sets of simultaneously-overlapping surfaces may be defined as: $S(M)=\{\sigma_K|K=1 \ldots M\}$, where $\sigma_K=\{R_{i1} \ldots R_{iQ} | R_{i1} \ldots R_{iQ}$ mutually overlap and $Q>BL_{DCU}\}$ Next, at 325, a selection of those elements to blend on the DCU, e.g. DCU 140, and thereafter any excess elements to be blended by the processing unit, such as GPU 150, is performed. In this example, in order to consider the cost of blending a 2D rectangular surface on the GPU proportional to the number of pixels it has, a consideration of its proportionality to its surface area is made. Given some set $\sigma_K=\{R_{i1} \ldots, R_{iQ}\}$ from 315, a number of elements (G) are selected to blend on the GPU 150, where $G=Q-BL_{DCU}+1$. In addition, a lowest-cost interval of G consecutive elements from $\sigma_K$ in a form of $I(\sigma_K)$ is selected. The interval's cost is given as a sum of the areas of the surfaces inside it:

$$C(I(\sigma_K))=C(\{R_{j1} \ldots R_{jG}\})=\Sigma_{p=1}^{p=G}\text{Area}(R_{jp}) \quad [1]$$

In this example, the lowest-cost interval (C) of G consecutive elements from $\sigma_K$ is determined with a single pass over $\sigma_K$. This is achieved by first calculating $C(\{R_{i1} \ldots R_{iG}\})$, of the first G elements in $\sigma_K$. Having calculated $C(\{R_{ip}, R_{iq}\})$ with $q=p+G-1$, the blend manager determines $C(\{R_{ip'}; R_{iq'}\})$, where $p'=p+1$, $q'=q+1$ as: $C(\{R_{ip'}, R_{iq'}\})=C(\{R_{ip}, R_{iq}\})-\text{Area}(R_{ip})+\text{Area}(R_{iq''})$. This operation is repeated for $p=1 \ldots BL_{DCU}$. Advantageously, each step takes up a low amount of computational complexity, e.g. O(1) (constant time) to run. Therefore, determining the smallest-cost interval of G elements is performed in $\Theta(Q)$.

Figure 4:
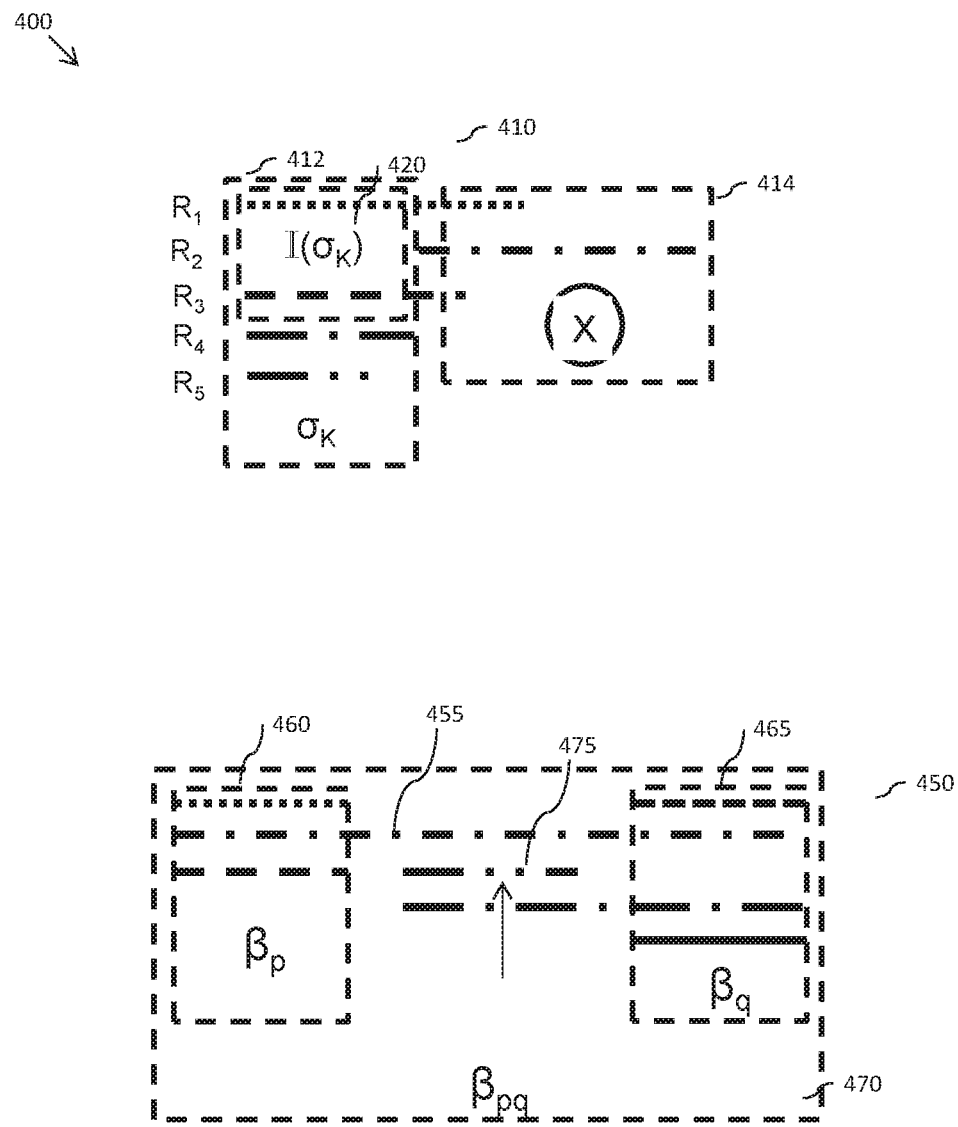
FIG. 4 illustrates pictorially a variety of 2-rectangle overlap arrangements for a pixel blending operation in accordance with example embodiments of the invention.

One example of an application of 325 is illustrated in FIG. 4. The output from the blend manager at 325 is a list of all sets whose surfaces will be blended on the GPU 150: $B(P)=\{\beta_K|K=1 \ldots P\}$, where: $\beta_K=\{R_{j1} \ldots R_{jT}|R_{jT} \ldots R_{j1}$ will be blended in this order on the GPU}. If we assume that 325 provides $\beta_K=\{R_{j1} \ldots R_{jT}\}$, then surfaces $R_{jT} \ldots R_{j1}$ (in this order) may be blended on the GPU 150 with a lowest performance cost and correct visual output, because: they follow the correct global blending order and they advantageously lead to a complete avoidance of the DCU's maximum simultaneous overlap limitation. Also, if we assume that the blend manager determines B(M) that contains M intervals and covers a total of R surfaces out of the initial N (the number of surfaces in the original input list) then the number of DCU layers that are needed to render all surfaces is T=M+N−R. To understand why, consider that each of the M intervals, after blending on the GPU 150, takes up 1 DCU layer; then, since the M intervals cover R rectangles, it follows that the remaining N−R rectangles each take up 1 additional DCU layer.

Thus, at 330, the blend manager outputs a list of all sets whose surfaces will be blended on the at least one processing unit: $B(P)=\{\beta_K|K=1 \ldots P\}$, where $\beta_K=\{R_{j1} \ldots R_{jT} | R_{jT} \ldots R_{j1}$ will be blended in this order on the at least one processing unit (e.g. GPU 150)}, including allocating a first portion of the surfaces to be blended to the DCU (140) up to the determined DCU capability; and allocating a second portion of excess surfaces, beyond the DCU blending capability to be blended, to the at least one processing unit 130, 150.

In some optional examples, the flowchart may move to a DCU layer fitter operation 335. Although some examples of the invention may be employed in designs containing DCUs with a relatively large number of layers, e.g. 32-64 layers, it is envisaged that a majority of applications will never need to simultaneously render so many distinct surfaces on the screen. However, if it is assumed that T layers are needed for a complete and correct rendering of all surfaces, and if the number of layers available to the DCU 140 is $\lambda_{DCU}$ and $T > \lambda_{DCU}$, it is mandatory to reduce T. One example approach to reduce T is as follows. First, let us define $F(T)=\{\varphi|_K | K=1 \ldots T\}$ in 340, where $\varphi_K$ is either an unique interval $\beta_i$ from B(M) or a rectangle $R_j$ from L(N), excluding any rectangles in B(M). Each element from F(T) will therefore require one DCU layer. If we define a number of elements that need to be further blended on the GPU onto a single surface (μ) as: $\mu=T-\lambda_{DCU}+1$, the interval of μ consecutive elements may be selected from F(T) with the smallest total cost. For example, if $\varphi_K=\beta_i$, the cost of $\varphi_K$ is the cost of $\beta_i$ as in 325. If $\varphi_K=R_j$, the cost of $\varphi_K$ is the surface area of $R_j$.

After selection, the μ consecutive elements are joined into one, then removed from F(T) and the joined interval (now requiring only one DCU layer) is inserted back into F(T). This results in $T=\lambda_{DCU}$ and all surfaces can undergo final blending and rendering correctly 345 in order to generate composite pixel data.

Referring now to FIG. 4, a pictorial example 400 of a variety of rectangle overlap arrangements for a pixel blending operation is illustrated, in accordance with example embodiments of the invention. Given the original input surface list L(N) and $I(\sigma_K)$ for some $\sigma_K$ generated in 315, consecutive elements from $\sigma_K$ may not necessarily be consecutive in L(N). For example, in a known blending operation, as depicted in 410, let us consider 2 consecutive elements, $R_p$ and $R_q$ 412, from $I(\sigma_K)$. It is perfectly possible that some $R_t$ exists, with p<t<q (meaning that Rt is between Rp and Rq relative to the established blend order), such that $R_p$, $R_t$ and $R_q$ mutually overlap, but where $R_t \notin \sigma_K$. This is perfectly possible, because even though $R_t$ overlaps with $R_p$ and $R_q$, it may not overlap with other elements in $\sigma_K$, therefore it is not a member of $\sigma_K$ itself. If we were to blend $R_p$ and $R_q$ on the GPU an incorrect result would be obtained. This is because blending is not commutative, i.e. given 2 surfaces $R_p$ and $R_q$, blending $R_p$ on top of $R_q$ produces a different output than blending $R_q$ on top of $R_p$. Here, in the example of FIG. 4: $|\sigma_K|=4$, $I(\sigma_K)=\{R_1, R_3\}$, $BL_{DCU}=3$. Referring to the example, let us consider p=1, q=3 and t=2; if Rp and Rq would be blended without Rt, then the blend result of Rp and Rq would be placed either 'above' Rt (which is incorrect, because Rt should come above Rq) or 'below' Rt (which is also incorrect, because Rp should come above Rt).

In contrast, in accordance with examples of the invention, the bounding box 420 of $\sigma_K$, namely a rectangle that contains all surfaces from $\sigma_K$, is calculated. After calculating the bounding box 420 for $\sigma_K=\{i_1 \ldots R_{iQ}\}$, all surfaces where $R_t \in L(N)$ are checked (the input surface list) such that $i_1 < t < i_Q$. If $R_t$ overlaps with the bounding box 420, then $R_t$ is added to $\sigma_K$. The updated set $\sigma_{Ke}$, after all additions, is identified as having this property: if $R_p$ and $R_q$ are consecutive elements from $\sigma_{Ke}$; then it is safe to blend them on the GPU 150.

In some examples of the invention, following on from identifying $\sigma_K$ as one of the maximal sets of layers that simultaneously overlap and whose size is greater than the DCU's blend limit and after applying the bounding box-based extension of $\sigma_K$, it may be assumed that, for any elements $R_p$ and $R_q$ inside $\sigma_K$, no $R_t$ exists for any p<t<q such that $R_p$, $R_t$ and $R_q$ mutually overlap, but $R_t \notin \sigma_K$. Hence, if p+1<q ($R_p$ and $R_q$ are not consecutive in L(N)), then for any p<t<q, $R_t$ can be blended in any order relative to $R_p$ and $R_q$. Thus, in some examples of the invention the blend manager 213 then calculates $\beta_K=I\sigma_{Ke})$ instead of $I(\sigma_K)$, as illustrated on 450. After calculating all intervals $\beta_K$, it is possible that some of them will overlap (i.e. some surface $R_p$ 455 may belong to multiple intervals simultaneously). If some $\beta_p$ 460 and $\beta_q$ 465 overlap, such as surface $R_p$ 455, then their elements on the GPU could be rendered multiple times, thereby wasting performance.

In this example, the blend manager 213 defines $B(M)=\{\beta_1, \ldots, \beta_M\}$. The blend manager 213 checks all surface/rectangular pairs ($\beta_p$, $\beta_q$), for example by checking the intersection relative to the bounding boxes of $\beta_p$ and $\beta_q$, and if they intersect, joins them by calculating $\beta_{pq}=\beta_p \cup \beta_q$. The blend manager 213 then removes $\beta_p$ 460 and $\beta_q$ 465 from B(M) and adds $\beta_{pq}$ 470 to B(M). Each new interval $\beta_{pq}$ 470 obtained from a join operation behaves like a normal set of the form $\sigma_K$. This may add to $\beta_{pq}$ 470 elements, such as element 475, which were not in either $\beta_p$ 460 or $\beta_q$ 465. As this brings us back to the $\sigma_K$ calculation step, these operations are repeated until there are no more intervals to join.

It is envisaged that the examples of the invention may be implemented, at least in part, in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, examples of the invention have been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data processing system comprises a graphics display component for creating an image to be displayed, the graphics display component comprising:
   a display controller unit, DCU;
   a blend manager; and
   at least one processing unit; and
   wherein the blend manager is configured to:
      determine whether a capability of the DCU to simultaneously blend a number of surfaces of an image to be displayed is exceeded; and, in response to the DCU blending capability being exceeded:
      allocate a first portion of the surfaces to be blended to the DCU up to the determined DCU capability; and
      allocate a second portion of excess surfaces, beyond the DCU blending capability to be blended, to the at least one processing unit;
      wherein the at least one processing unit blends the second portion of excess surfaces to generate a second blended portion and the DCU blends the first portion of the surfaces to generate a first blended portion, and
      wherein one of the at least one processing unit or the DCU generates composite data for displaying the image using the first and second blended portions.

2. The data processing system of claim 1 wherein the blend manager is configured to receive sets of overlapping surfaces and then allocate the received sets between the at least one processing unit and the DCU.

3. The data processing system of claim 2 wherein the overlapping surfaces comprise active layers and the blend manager is configured to determine whether a number, m, of active layers in the set, M, exceeds a blend limit, n, of a maximum number of graphical surfaces that can be blended simultaneously by the DCU and, in response thereto, identifies a subset N of up to n layers from the set M of active layers for allocating to the DCU.

4. The data processing system of claim 3 wherein the graphical surfaces comprise pixel rectangles and the at least one processing unit identifies a maximal set, M, of active layers of N rectangle regions that can be blended by the DCU.

5. The data processing system of claim 4, wherein the processing unit identifies the maximal set, M, of active layers of N rectangle regions that are guaranteed to simultaneously overlap.

6. The data processing system of claim 1 wherein the blend manager selects a number of elements (G) of the second portion of excess surfaces to blend on the at least one processing unit and determines a lowest-cost interval sum of G consecutive elements from each set ($\sigma_K$) of a number of maximal sets of layers that simultaneously overlap and whose size is greater than the DCU blending capability.

7. The data processing system of claim 6 wherein the blend manager is further configured to:
   check all initial surfaces outside of each set $\sigma_K$ and if any such surface overlaps with a bounding box of the set $\sigma_K$, then that surface is inserted into the set $\sigma_K$ to produce an extended set, $\sigma_{Ke}$.

8. The data processing system of claim 7 wherein the blend manager is further configured to:
   identify all extended sets or $\sigma_{Ke}$, and in response to any two such extended sets $\sigma_{Ke}$ being identified as overlapping, merge them together into one set; and
   repeat the identify and merge operations until there are no more sets of the form $\sigma_K$ that can be merged.

9. The data processing system of claim 6 wherein the blend manager is configured to:
   determine B(M) that contains M intervals of surfaces that can be blended on the processing unit and covers a total of R surfaces out of an initial number of surfaces in an input list of size, N, such that a number of DCU layers that are needed to render all surfaces is T=M+N−R; and
   identify either a rectangle (Ri) directly or a unique interval ($\beta_i$) from B(M) after being blended on the at least one processing unit.

10. The data processing system of claim 6 wherein the blend manager is further configured to:
   sort the elements Ri and $\beta_i$ according to a global blending order into a list, $\varphi$
   select a number ($T-\lambda_{DCU}+1$) of consecutive elements from the list, $\varphi$, that have a smallest total cost
   join the number ($T-\lambda_{DCU}+1$) of consecutive elements into one element by blending them on the at least one processing unit;
   remove the consecutive elements from the list; and
   replace the removed consecutive elements with their result after joining such that the total number of remaining surfaces that need blending is equal to the number of layers ($\lambda_{DCU}$) available to the DCU.

11. The data processing system of claim 1 wherein the DCU blending capability comprises at least one of:
   (i) a first DCU limit of a number of layers that the DCU is able to process in parallel; and
   (ii) a second DCU limit of a number of simultaneous overlaps that it can process correctly within a single pixel that exceeds a number of layers, n, that the DCU is capable of handling.

12. The data processing system of claim 1 wherein the at least one processing unit is a graphical processor unit.

13. A method of managing graphics layers within a data processing system comprising a display controller unit, DCU, and at least one processing unit, the method comprising:
   determining whether a capability of the DCU to simultaneously blend a number of surfaces of an image to be displayed is exceeded; and, in response to the DCU blending capability being exceeded:
   allocating a first portion of the surfaces to be blended to the DCU up to the determined DCU capability;
   allocating a second portion of excess surfaces beyond the DCU blending capability to the at least one processing unit; and
   generating composite pixel data to be displayed based on blends performed by the at least one processing unit and the DCU.

14. The method of claim 13 further comprising allocating sets of overlapping surfaces between the at least one processing unit and the DCU.

15. The method of claim 14 wherein the overlapping surfaces comprise active layers, the method further comprising:
   determining whether a number, m, of active layers in the set, M, exceeds a blend limit, n, of a maximum number of graphical surfaces that can be blended simultaneously by the DCU and, in response thereto, identifies a subset N of up to n layers from the set M of active layers for allocating to the DCU.

16. The method of claim 15 wherein the graphical surfaces comprise pixel rectangles and the at least one processing unit identifies a maximal set, M, of active layers of N rectangle regions that can be blended by the DCU.

17. The method of claim 16, wherein the at least one processing unit identifies the maximal set, M, of active layers of N rectangle regions that are guaranteed to simultaneously overlap.

18. The method of claim 13 further comprising selecting a number of elements (G) of the second portion of excess surfaces to blend on the at least one processing unit and determining a lowest-cost interval sum of G consecutive elements from each set ($\sigma_K$) of a number of maximal sets of layers that simultaneously overlap and whose size is greater than the DCU blending capability.

19. The method of claim 18 further comprising:
checking all initial surfaces outside of each set $\sigma_K$ and if any such surface overlaps with a bounding box of the set $\sigma_K$, then that surface is inserted into the set $\sigma_K$ to produce an extended set, $\sigma_{Ke}$.

20. The method of claim 19 further comprising:
identifying all extended sets or $\sigma_{Ke}$, and in response to any two such extended sets $\sigma_{Ke}$ being identified as overlapping, merging them together into one set; and
repeating the identify and merge operations until there are no more sets of the form $\sigma_K$ that can be merged.

\* \* \* \* \*